United States Patent [19]

Burroway et al.

[11] Patent Number: 4,868,259

[45] Date of Patent: Sep. 19, 1989

[54] EMULSION POLYMERIZATION PROCESS

[75] Inventors: Gary L. Burroway, Doylestown; Robert D. Mate, Stow, both of Ohio

[73] Assignee: The Goodyear Tire & Rubber Company, Akron, Ohio

[21] Appl. No.: 104,914

[22] Filed: Oct. 6, 1987

Related U.S. Application Data

[63] Continuation of Ser. No. 863,489, May 15, 1986, abandoned.

[51] Int. Cl.$^4$ ................................................. C08F 2/22
[52] U.S. Cl. ..................................... 526/203; 526/225; 524/460
[58] Field of Search ................. 524/460; 526/203, 225

[56] References Cited

U.S. PATENT DOCUMENTS 3,444,151  5/1969  Verdol et al. ........................ 526/203
4,440,897  4/1984  Maska .................................. 524/460

*Primary Examiner*—Joseph L. Schofer
*Assistant Examiner*—Alex H. Walker
*Attorney, Agent, or Firm*—Alvin T. Rockhill

[57] ABSTRACT

The present invention relates to a process for preparing a polymeric resin which contains repeat units which are derived from maleic anhydride in an emulsion polymerization process which comprises polymerizing a vinyl aromatic monomer and an alkyl acrylate monomer in an aqueous medium in the presence of a styrene-maleic anhydride seed polymer which is neutralized with a tertiary amine. Such polymers, which contain repeat units which are derived from a vinyl aromatic monomer, an alkyl acrylate monomer, and maleic anhydride, are particularly useful as electrostatic image developing toner resins. For instance, resins, which are comprised of repeat units which are derived from styrene, butyl acrylate, and maleic anhydride, are particularly useful as toner resins.

19 Claims, No Drawings

EMULSION POLYMERIZATION PROCESS

This is a continuation of application Ser. No. 863,489, filed May 15, 1986, now abandoned.

BACKGROUND OF THE INVENTION

Maleic anhydride cannot normally be polymerized into polymers utilizing standard emulsion polymerization techniques. This is because the maleic anhydride hydrolyzes to the acid form in the presence of water wherein the polymerization process occurs and the resulting resin yields different characteristic physical properties than those desired. For this reason, polymers containing repeat units which are derived from maleic anhydride are normally synthesized in a solution polymerization process. Such solution polymerizations are generally carried out in an organic solvent which is inert with respect to the monomers being polymerized and the polymer being prepared.

It has been determined that polymers containing a vinyl aromatic monomer, an alkyl acrylate monomer, and maleic anhydride are of great value as electrostatic image developing toners. This is because the repeat units therein which are derived from maleic anhydride act as a built-in charge control agent. This eliminates the necessity for adding separate charge control agents, such as lacmoid (resorcinol blue), to the toner resin.

The possibility of synthesizing such polymeric resins, which contain repeat units which are derived from maleic anhydride, is attractive for numerous obvious reasons. For instance, the need for utilizing an inert organic liquid as the solvent for the polymerization and the costs associated therewith are eliminated.

SUMMARY OF THE INVENTION

The present invention relates to an emulsion polymerization technique for preparing polymeric resins which are comprised of repeat units which are derived from a vinyl aromatic monomer, an alkyl acrylate monomer and maleic anhydride. Such resins are particularly useful as electrostatic image developing toner resins for utilization in photocopy machines. Such resins which contain repeat units that are derived from maleic anhydride are particularly desirable because they in effect have a built-in charge control agent. Thus, the need for post addition of a separate charge control agent is eliminated.

The present invention more specifically relates to a process for preparing a polymeric resin that contains repeat units which are derived from maleic anhydride in an emulsion polymerization process which comprises polymerizing a vinyl aromatic monomer and an alkyl acrylate monomer in an aqueous polymerization medium in the presence of a styrene-maleic anhydride seed polymer which is neutralized with a tertiary amine at a temperature within the range of 10° C. to 79° C. The present invention further reveals a process for preparing a polymeric resin which is particularly useful as an electrostatic image developing toner in an emulsion polymerization process which comprises polymerizing a vinyl aromatic monomer and an alkyl acrylate monomer in an aqueous polymerization medium which is comprised of (A) water, (B) an emulsifier, (C) a free radical generator, (D) a copolymer of a vinyl aromatic monomer and maleic anhydride which is neutralized with a tertiary amine, (E) the vinyl aromatic monomer, and (F) the alkyl acrylate monomer; at a temperature within the range of 10° C. to 79° C., wherein the aqueous polymerization medium is at a pH within the range of 8 to 11.

DETAILED DESCRIPTION OF THE INVENTION

The polymeric resins of this invention are synthesized in an aqueous medium which is comprised of (1) a copolymer of a vinyl aromatic monomer and maleic anhydride which is neutralized with a tertiary amine: (2) a vinyl aromatic monomer: (3) an alkyl acrylate monomer: (4) a free radical generator: (5) an emulsifier; and (6) water. The vinyl aromatic/maleic anhydride copolymer will normally contain from about 20% to about 80% vinyl aromatic monomer and from about 20% to about 80% maleic anhydride, based upon total monomers by weight. In most cases the copolymer of the vinyl aromatic monomer and maleic anhydride will contain from about 35% to 65% vinyl aromatic monomer and from about 35% to 65% maleic anhydride. Preferably, such vinyl aromatic/maleic anhydride copolymers will contain from about 45% to 55% vinyl aromatic monomer and from about 45% to 55% maleic anhydride. The distribution of repeat units derived from the vinyl aromatic monomer and maleic anhydride in such polymers can be essentially random. 25 The vinyl aromatic monomers which can be utilized in such vinyl aromatic/maleic anhydride copolymers will be selected so as to be copolymerizable with maleic anhydride. Such vinyl aromatic monomers typically contain from 8 to 20 carbon atoms. Usually the vinyl aromatic monomer will contain from 8 to 14 carbon atoms. The most widely used vinyl aromatic monomer is styrene. Some examples of vinyl aromatic monomers that can be utilized include: 1-vinyl napthalene, 2-vinyl napthalene, 3-methyl styrene, 4-propyl styrene, 4-cyclohexyl styrene, 4-dodecylstyrene, 2-ethyl-4-benzyl styrene, 4-(phenylbutyl) styrene, and the like.

The molecular weight of the vinyl aromatic/maleic anhydride copolymers that can be utilized can vary widely. However, in most cases such vinyl aromatic/maleic anhydride copolymers will have a molecular weight within the range of about 500 to about 20,000. Such copolymers will more typically have a molecular weight within the range of about 1,000 to about 5,000. In most cases it will be preferable for the vinyl aromatic/maleic anhydride copolymer to have a molecular weight within the range of about 1,500 to about 2,500.

Vinyl aromatic/maleic anhydride copolymers which are suitable for use as seed polymers in the practice of the present invention are commercially available. For instance, SMA® resins, which are sold by ARCO Chemical Company, can be utilized as seed polymers. These resins typically have number average molecular weights that range from 1,600 to 2,500 and acid numbers that range from 105 to 480. The vinyl aromatic/maleic anhydride seed polymers utilized will normally be copolymers of styrene and maleic anhydride. Such seed polymers will commonly have the structural formula:

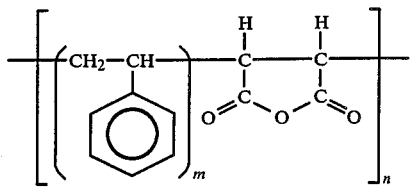

wherein m is an integer from 1 to 3 and wherein n is an integer from 6 to 8.

The vinyl aromatic/maleic anhydride copolymer must be neutralized before it can be utilized as a seed polymer in the synthesis technique of the present invention. Tertiary amines are utilized to neutralize the vinyl aromatic/maleic anhydride seed polymers in order to minimize side reactions with the repeat units which are derived from maleic anhydride. This is because it has been found that the use of primary and secondary amines can lead to the formation of amides. Essentially, any type of tertiary amine can be utilized to neutralize the seed polymer. However, tertiary amines which are reasonably volatile are greatly preferred. Trialkyl amines and triaryl amines are particularly well suited for use in neutralization procedures. Dialkyl amino alcohols are the most preferred tertiary amines. Some representative examples of dialkyl amino alcohols which can be used include dimethyl amino ethanol, diethyl amino ethanol, dipropyl amino ethanol and the like.

The additional vinyl aromatic monomer which is polymerized into the polymeric resins of the present invention is generally the same as the vinyl aromatic monomer utilized in the vinyl aromatic/maleic anhydride seed polymer. However, a different type of vinyl aromatic monomer can be utilized. It is, of course, necessary for the vinyl aromatic monomer utilized to be copolymerizable with alkyl acrylate monomers and the vinyl aromatic/maleic anhydride seed polymer used. Generally, any vinyl aromatic monomer which is known to polymerize in free radical systems can be used. Such vinyl aromatic monomers typically contain from 8 to 20 carbon atoms. Usually, the vinyl aromatic monomer will contain from 8 to 14 carbon atoms. Some representative examples of vinyl aromatic monomers that can be utilized include styrene, 1-vinyl napthalene, 2-vinyl napthalene, 3-methyl styrene, 4-propyl styrene, 4-cyclohexyl styrene, 4-dodecyl styrene, 2-ethyl-4-benzyl styrene, 4-(phenylbutyl) styrene and the like. Styrene is generally the preferred vinyl aromatic monomer.

The alkyl acrylate monomers that can be used generally have the structural formula:

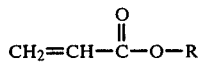

wherein R represents an alkyl group containing from 1 to 10 carbon atoms. The alkyl group in such alkyl acrylate monomers will preferably contain from 2 to 8 carbon atoms with alkyl groups which contain 4 carbon atoms being most preferred. Accordingly, ethyl acrylate, propyl acrylate, butyl acrylate, pentyl acrylate, hexyl acrylate, and 2-ethyl hexyl acrylate are preferred alkyl acrylate monomers with butyl acrylate being the most preferred. The alkyl groups in such alkyl acrylate monomers can be straight chained or branched. Thus, normal-propyl acrylate, isopropyl acrylate, normal butyl acrylate, or tertiary-butyl acrylate can be employed. Normal-butyl acrylate is a particularly preferred monomer.

Essentially any type of free radical generator can be used to initiate the polymerizations of this invention. For example, free radical generating chemical compounds, ultra-violet light or radiation can be used. In order to ensure a satisfactory polymerization rate, uniformity, and a controllable polymerization, free radical generating chemical agents are generally used with good results. Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like: the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy) cyclohexane, and the like. Water soluble peroxygen free radical initiators are especially useful in aqueous emulsion polymerizations. Generally from about 0.05 phm (parts per hundred parts of monomer) to 1 phm of initiator will be utilized. In most cases about 0.1 to about 0.4 phm of a free radical initiator will be utilized. Preferably from about 0.2 to about 0.3 phm of a free radical initiator will be employed.

A wide variety of types of emulsifiers or surfactants can be utilized in the process of this invention. For instance, rosin acid or fatty acid emulsifiers can be utilized. However, synthetic surfactants are normally preferred since they are less likely to react with the repeat units in the seed polymer which are derived from maleic anhydride. Salts of alkyl sulfates, alkyl sulfonates and alkyl phosphates are particularly preferred for utilization as emulsifiers. The alkyl groups in these compounds generally contain from 1 to 30 carbon atoms. Normally the alkyl groups in these surfactants will contain from 8 to 20 carbon atoms. The surfactant utilized will normally be a sodium, potassium, magnesium or ammonium salt. Sodium lauryl sulfate, ammonium lauryl sulfate, sodium dodecyl benzene sulfonate, and ammonium dodecyl benzene sulfonate are some representative examples of highly suitable emulsifiers.

Generally from about 1 phm to about 6 phm of emulsifier is utilized in preparing the aqueous polymerization medium. It has been determined that the use of less than 1 phm of surfactant leads to latex instability. On the other hand the utilization of more than 6 phm of surfactant causes isolation problems. In most cases, it will be preferred to utilize from 2 phm to 4 phm of emulsifier. The precise amount of emulsifier required in order to attain optimal results will, of course, vary with the specific emulsifier being used and with the monomers and seed polymer being polymerized. However, persons skilled in the art will be able to easily ascertain the specific amount of emulsifier required in order to attain optimal results.

The polymerizations of this invention are conducted at a temperature within the range of about 50° F. (10° C.) to 175° F. (79° C.) In most cases it will be preferred for the polymerization temperature to be maintained within the range of 100° F. (38° C.) to 160° C.). It is generally more preferred for the polymerization temperature to be within the range of 110° F. (43° C.) to 130° F. (54° C.). The polymerization time required in order to carry out such polymerizations generally ranges between about 3 hours and about 12 hours. In most cases the polymerization reaction can be carried out in 4 to 8 hours.

The pH of the aqueous polymerization medium will normally be adjusted with an amine so as to be within the range of about 8 to about 11. It will generally be preferred for the pH of the aqueous polymerization medium to be in the range of 9.0 to 9.5. It is also highly desirable for the aqueous polymerization medium to be oxygen free. This greatly reduces the amount of free radical generator required to initiate the polymerization. Oxygen can be removed from the water utilized in the aqueous polymerization medium by sparging it with nitrogen or an inert gas. More exotic techniques for removing oxygen from the water, such as the one disclosed in U.S. Pat. No. 4,565,634, can also be utilized, but will not normally be necessary.

In most cases a molecular weight regulator or polymerization modifier will also be utilized in the aqueous polymerization medium. Standard modifiers, which promote chain transfer such as, mercaptans and halogenated compounds, can be used for this purpose. Tertiary-dodecyl mercaptan is an example of a very widely used polymerization modifier. Generally, from about 0.1 phm to about 1 phm of polymerization modifier will be utilized. It is generally preferred to utilize 0.2 phm to 0.5 phm of modifier.

The polymeric resins made in accordance with the process of this invention normally have a gel content of 3% to 30%. In most cases it will be preferable for electrostatic image developing toner resins to have a gel content of 10% to 15%. This is because toner resins with gel contents of greater than 15% are often too tough to process and because toner resins with gel contents of less than 10% may cause hot offset deficiency (black streams on copy paper). The gel contents of these polymers are determined in accordance with the procedure specified in the Journal of Polymer Science, Al, Vol. 8, page 1306 (1970).

In cases where the polymeric resin is being utilized in toner applications, it must have a suitable softening point and fusing characteristics. Accordingly, such polymeric resins will normally have a glass transition temperature between about 55° C. and 70° C. In most cases, it will be preferred for the polymeric resin to have a glass transition temperature of 60° C. to 65° C.

In order for the polymer resin to have the proper charge control characteristics, it will contain from about 3% to about 5% repeat units which are derived from maleic anhydride, based upon the total weight of the polymer. This is required in order for the polymeric resin to have the ability to build up a charge of 10 to 35 microcoulombs per gram without the need for post addition of separate charge control agents. In most cases the polymeric resins made by utilizing the technique of this invention will have an ability to build up a charge of 20 to 30 microcoulombs per gram. The polymeric resins which are particularly suitable as electrostatic image developing toners will also have a soften point within the range of 180° C. to 200° C., as determined by the ring and ball technique. In most cases it will be preferred for toner resins to have a soften point of 190° C. to 195° C.

The exact monomeric makeup of such polymeric resins will vary with the particular monomers being utilized. However, persons skilled in the art will be able to adjust monomeric ratios in order to attain useful polymers having the required electrostatic charge control characteristics, glass transition temperature, gel content, and softening point. The amount of vinyl aromatic monomer and alkyl acrylate monomer utilized in the polymerization will, of course, also depend upon the amount of maleic anhydride incorporated into the seed polymer being utilized. Typical graft polymers which are derived from maleic anhydride, a vinyl aromatic monomer, and an alkyl acrylate monomer are prepared by utilizing from about 5 phm to about 10 phm of a seed polymer, from about 10 phm to about 40 phm of the alkyl acrylate monomer, and from about 60 phm to about 90 phm of the vinyl aromatic monomer in the aqueous polymerization medium. A typical graft polymer of maleic anhydride, styrene, and butyl acrylate can be prepared by utilizing from about 5 to about 10 phm of a seed polymer, from about 15 phm to about 35 phm of butyl acrylate, and from about 65 phm to about 85 phm of styrene in the aqueous polymerization medium. The seed polymers utilized in such a typical polymerization will contain about 50% maleic anhydride and 50% styrene, based upon total repeat units in the polymer by weight.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment a resin was prepared in a one quart (0.95 liter) polymerization bottle. An aqueous polymerization medium was first prepared by adding 390 grams of water, 1.04 grams of trisodium phosphate (a buffer/electrolyte), 15.6 grams of sodium lauryl sulfate, 18.2 grams of SMA ® 3000 resin, 0.52 grams of ammonium persulfate, 202.8 grams of styrene, 1.3 grams of tertiary-dodecyl mercaptan, and 57.2 grams of butyl acrylate to the polymerization bottle. The SMA ® 3000A contained about 75% styrene and 25% maleic anhydride, had a molecular weight of about 1,900, an acid number of 275, and a melting point of 115° C. to 130° C. The pH of the aqueous polymerization medium prepared was adjusted to 10 by the addition of an amine. The contents of the polymerization bottle were allowed to polymerize in a constant temperature bath which was maintained at 125° F. (52° C.) for a period of about 6 hours. The polymer produced had a glass transition temperature of 64.6° C., a gel content of 20.2%, and a melt index of 5.42.

EXAMPLE 2

The procedure utilized in Example 1 was repeated in this experiment except that only 13 grams of SMA ® 3000 was added to the aqueous polymerization medium. The polymer prepared utilizing this procedure had a gel content of 15.4% and a melt index of 8.14.

EXAMPLE 3

The procedure utilized in Example 1 was repeated in this experiment except that only 7.8 grams of SMA ® 3000 was added to the aqueous polymerization medium. In this experiment the polymer made had a gel content of 12.2% and had a melt index of 24.13.

EXAMPLE 4

In this experiment the procedure utilized in Example 2 was repeated except that SMA ® 17352 was utilized in place of the SMA ® 3000 utilized in Example 2. The procedure utilized in this experiment also differed from the procedure utilized in Example 2 in that 6.5 grams of sodium lauryl sulfate, 192.4 grams of styrene, and 76.6 grams of butyl acrylate were utilized in the aqueous polymerization medium. The graft polymer made utilizing this procedure had a gel content of 17.6% and a melt index of 0.5. SMA ® 17352 contains about 50% styrene and 50% maleic anhydride, has a molecular weight of 1,700, a melting range of 50° C. to 170° C. and an acid number of 270.

While certain representative embodiments and details have been shown for the purpose of illustrating the present invention, it will be apparent to those skilled in this art that various changes and modifications can be made therein without departing from the scope of the present invention.

What is claimed is:

1. A process for preparing a polymeric resin which is particularly useful as an electrostatic image developing toner in an emulsion polymerization process which comprises polymerizing a vinyl aromatic monomer and an alkyl acrylate monomer in an aqueous polymerization medium which is comprised of (A) water, (B) an emulsifier, wherein said emulsifier is a salt of at least one member selected from the group consisting of alkyl sulfonates, alkyl sulfates, and alkyl phosphates, (C) a free radical generator, (D) a seed polymer which is a copolymer of a vinyl aromatic monomer and maleic anhydride which is neutralized with a tertiary amine, (E) the vinyl aromatic monomer, and (F) the alkyl acrylate monomer; at a temperature within the range of 10° C., to 79° C. wherein the aqueous polymerization medium is at a pH within the range of 8 to 11.

2. A process for preparing a polymeric resin which contains repeat units which are derived from maleic anhydride in an emulsion polymerization process which comprises polymerizing a vinyl aromatic monomer and an alkyl acrylate monomer in an aqueous polymerization medium in the presence of a styrene-maleic anhydride seed polymer which is neutralized with a tertiary amine and in the presence of an emulsifier which is a salt of at least one member selected from the group consisting of alkyl sulfonates, alkyl sulfates, and alkyl phosphates at a temperature within the range of 10° C. to 79° C. and at a pH within the range of 8 to 11.

3. A process as specified in claim 2 wherein said seed polymer contains from 20% to 80% by weight vinyl aromatic monomers and from 20% to 80% by weight maleic anhyride. anhydride.

4. A process as specified in claim 1 wherein said member selected from the group consisting of salts of alkyl sulfonates, salts of alkyl sulfates, and salts of alkyl phosphates contains from 1 to 30 carbon atoms.

5. A process as specified in claim 4 wherein said copolymer of a vinyl aromatic monomer and maleic anhydride contains from 20% to 80% by weight vinyl aromatic monomers and from 20% to 80% by weight maleic anhydride.

6. A process as specified in claim 5 wherein said aqueous polymerization medium further comprises from about 0.1 phm to 1 phm of at least one polymerization modifier.

7. A process as specified in claim 6 wherein said temperature is within the range of 38° C. to 71° C.

8. A process as specified in claim 3 wherein said vinyl aromatic monomer is selected from the group consisting of styrene, 1-vinyl napthalene, 2-vinyl napthalene, 3-methyl styrene, 4-propyl styrene, 4-cyclohexyl styrene, 4-dodecyl styrene, 2-ethyl-4-benzyl styrene and 4-(phenylbutyl) styrene.

9. A process as specified in claim 3 wherein said vinyl aromatic monomer contains form 8 to 20 carbon atoms.

10. A process as specified in claim 9 wherein said alkyl acrylate monomer has the structural formula:

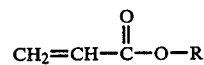

wherein R represents an alkyl group containing from 1 to 10 carbon atoms.

11. A process as specified in claim 10 wherein said temperature is within the range of 38° C. to 71° C.

12. A process as specified in claim 11 wherein said copolymer of a vinyl aromatic monomer and maleic anhydride contains form 35% by weight vinyl aromatic monomers and from 35to 65% by weight maleic anhydride.

13. A process as specified in claim 12 wherein said copolymer of a vinyl aromatic monomer and maleic anhydride has a molecular weight within the range of about 500 to about 20,000.

14. A process as specified in claim 13 wherein said free radical generator is a free radical generating chemical agent which is present in said aqueous polymerization medium at a concentration within the range of about 0.05 phm to about 1 phm and wherein said emulsifier is present in said aqueous polymerization medium at a concentration within the range of about 1 phm to about 6 phm.

15. A process as specified in claim 14 wherein said aqueous polymerization medium is at a pH within the range of 9.0 to 9.5; wherein said alkyl acrylate monomers are selected from the group consisting of ethyl acrylate, propyl acrylate, butyl acrylate, pentyl acrylate, and hexyl acrylate; wherein said copolymer of a vinyl aromatic monomer and maleic anhydride has a molecular weight within the range of about 1,000 to about 5,000; wherein said copolymer of a vinyl aromatic monomer and maleic anhydride contains from 45% to 55% by weight vinyl aromatic monomers and from 45% to 55% by weight maleic anhydride; wherein said vinyl aromatic monomer contains from 8 to 14 carbon atoms; and wherein said temperature is within the range of 43° C. to 54° C.

16. A process as specified in claim 1 wherein said vinyl aromatic monomer is styrene and wherein said alkyl acrylate monomer is butyl acrylate.

17. A process as specified in claim 16 wherein said copolymer of a vinyl aromatic monomer and maleic anhydride contains from 35% to 65% by weight styrene and from 35% by weight maleic anhydride and wherein said copolymer of a vinyl aromatic monomer and maleic anhydride has a molecular weight within the range of about 1,000 to about 5,000.

18. A process as specified in claim 1 wherein said aqueous polymerization medium is comprised of from about 5 phm to about 10 phm of said copolymer of a vinyl aromatic monomer and maleic anhydride which is neutralized with a tertiary amine, from about 10 phm to about 60 phm to about 90 phm of said vinyl aromatic monomer.

19. A process as specified in claim 18 wherein said aqueous polymerization medium further comprises from about 0.1 phm to 1 phm of at least one molecular weight regulator; wherein said temperature is within the range of 38° C. to 71° C.; and wherein said copolymer of a vinyl aromatic monomer and maleic anhydride contains for 35% to 65% by weight vinyl aromatic monomers and from 35% to 65% weight maleic anhydride.

* * * * *